(12) United States Patent
Won et al.

(10) Patent No.: US 11,036,035 B2
(45) Date of Patent: Jun. 15, 2021

(54) SUPER WIDE ANGLE ZOOM LENS

(71) Applicant: HYUNDAI MOBIS CO., LTD., Seoul (KR)

(72) Inventors: Yong Hee Won, Yongin-si (KR); Hyun Soo Lee, Yongin-si (KR); Jae Myung Ryu, Gumi-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 82 days.

(21) Appl. No.: 16/402,065

(22) Filed: May 2, 2019

(65) Prior Publication Data
US 2019/0339496 A1    Nov. 7, 2019

(30) Foreign Application Priority Data
May 4, 2018 (KR) .......................... 10-2018-0051762

(51) Int. Cl.
| G02B 9/34 | (2006.01) |
|---|---|
| G02B 13/06 | (2006.01) |
| H04N 5/235 | (2006.01) |
| H04N 5/232 | (2006.01) |

(52) U.S. Cl.
CPC ............... *G02B 13/06* (2013.01); *G02B 9/34* (2013.01); *H04N 5/2354* (2013.01); *H04N 5/23238* (2013.01)

(58) Field of Classification Search
CPC ...... G02B 13/06; G02B 9/34; H04N 5/23238; H04N 5/2354
USPC .................................................. 359/686–688
See application file for complete search history.

(56) References Cited

U.S. PATENT DOCUMENTS

| 8,643,957 B2* | 2/2014 | Chen ................. G02B 13/0045 359/713 |
| 2007/0146901 A1 | 6/2007 | Noda |
| 2017/0184815 A1* | 6/2017 | Wang .................. G02B 13/006 |

FOREIGN PATENT DOCUMENTS

| DE | 10 2013 217 240 A1 | 3/2014 |
|---|---|---|
| JP | 02-137812 A | 5/1990 |
| JP | 02-310511 A | 12/1990 |
| JP | 2003-255222 A | 9/2003 |
| JP | 2007-148138 A | 6/2007 |
| JP | 2014-109741 A | 6/2014 |
| JP | 2017-009778 A | 1/2017 |
| JP | 2017-146600 A | 8/2017 |
| KR | 10-0428242 B1 | 4/2004 |
| KR | 10-1491283 B1 | 2/2015 |

(Continued)

OTHER PUBLICATIONS

Office Action of corresponding Japanese Patent Application No. 2019-087740—9 pages (dated Mar. 17, 2020).

(Continued)

*Primary Examiner* — William Choi
(74) *Attorney, Agent, or Firm* — NovoTechIP International PLLC

(57) ABSTRACT

A super wide angle zoom lens may include: a first lens having convex surfaces at an object side and an image side, and formed in a spherical shape; a second lens having a concave surface at the object side; a third lens having a convex surface at the image side; and a fourth lens having a convex surface at the object side and formed in a spherical shape, wherein the first to fourth lenses are sequentially arranged from the object side toward the image side.

14 Claims, 10 Drawing Sheets

(56) References Cited

FOREIGN PATENT DOCUMENTS

KR     10-2018-0023299 A     3/2018

OTHER PUBLICATIONS

Office Action of corresponding German Patent Application No. DE 10 2019 206 409.4—8 pages (dated Aug. 3, 2020).

* cited by examiner

SUPER WIDE ANGLE ZOOM LENS

CROSS-REFERENCES TO RELATED APPLICATIONS

The present application claims priority to Korean application number 10-2018-0051762, filed on May 4, 2018, which is incorporated by reference in its entirety.

BACKGROUND OF THE INVENTION

The present invention relates to a super wide angle zoom lens, and more particularly, to a super wide angle zoom lens capable of raising transfer efficiency of light emitted from a light source and increasing a field of view (FOV), and having fixed brightness.

In general, various lighting apparatuses are mounted on the front and rear of a vehicle, in order to provide safety and driving convenience. Recently, a light emitting diode (LED) is widely used as a lighting source of such lighting apparatuses for a vehicle. The lighting apparatus using an LED as a light source needs to include lenses which can increase an FOV and reduce a manufacturing cost, while more efficiently transmitting light emitted from the lighting source.

According to such a need, research has been conducted in order to reduce the number of used lenses and to raise a numerical aperture (NA). However, when the number of lenses is reduced, it makes it difficult to transmit light emitted from the light source as much as possible.

The related art of the present invention is disclosed in Korean Patent Registered No. 10-1491283 registered on Feb. 6, 2015 and entitled "Headlamp for vehicle".

SUMMARY OF THE INVENTION

Embodiments of the present invention are directed to a super wide angle zoom lens capable of raising transfer efficiency of light emitted from a light source and increasing an FOV, and having fixed brightness.

In one embodiment, a super wide angle zoom lens may include: a first lens having convex surfaces at an object side and an image side, and formed in a spherical shape; a second lens having a concave surface at the object side; a third lens having a convex surface at the image side; and a fourth lens having a convex surface at the object side and formed in a spherical shape, wherein the first to fourth lenses are sequentially arranged from the object side toward the image side.

The first lens may include glass.

The fourth lens may include glass.

The second lens may include glass.

The third lens may include plastic.

The first lens may have an Abbe number of 35 or more and a d-line refractive index of 1.7 to 1.92.

The second lens may have an Abbe number of less than 30 and is a flint-based lens.

The third lens may have an aspherical shape.

The fourth lens may have a positive refractive power, and have a meniscus shape convex toward the object side.

The super wide angle zoom lens may satisfy the following equation: $9 \leq |f_3/f|$, where $f_3$ represents a focal distance of the third lens, and f represents a focal distance of the entire super wide angle zoom lens.

One LED or an LED array including a plurality of LEDs may be placed at the image side, and specific luminance distribution may be formed at the object side.

All lenses positioned after the third lens may have an Abbe number of 40 or more.

The super wide angle zoom lens may satisfy the following equation: $0.9 \leq r_{last}/f \leq 3$, where $r_{last}$ represents a curvature of the last surface of the entire super wide angle zoom lens, and f represents a focal distance of the entire super wide angle zoom lens.

The super wide angle zoom lens may satisfy the following equation: $-0.01 \leq (r_1 - r_{last})/(r_1 + r_{last}) \leq 0.2$, where $r_1$ represents a curvature of the first surface of the entire super wide angle zoom lens, and $r_{last}$ represents a curvature of the last surface of the super wide angle zoom lens.

The super wide angle zoom lens may satisfy the following equation: $0.15 \leq d_3/TL \leq 0.25$, where $d_3$ represents the thickness of the third lens, and TL represents a total length of the super wide angle zoom lens from the curvature of the first surface to the curvature of the last surface.

The super wide angle zoom lens in accordance with the present invention may be optimized by using a cemented lens composed of two lenses for correcting chromatic aberration, one aspherical lens and one additional lens for correcting a curvature of image field. Thus, the super wide angle zoom lens can raise the NA to 0.75 or more even while using four lenses, thereby raising transmission efficiency of light and increasing the FOV.

DESCRIPTION OF SPECIFIC EMBODIMENTS

Hereafter, a super wide angle zoom lens in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
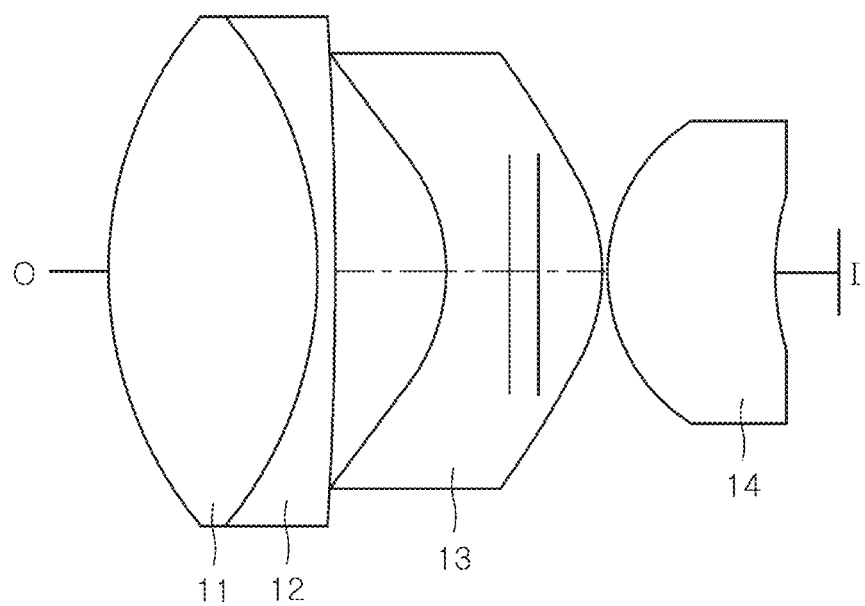
FIG. 1 is an optical path diagram of a first embodiment of a super wide angle zoom lens in accordance with the present invention, illustrating an arrangement of component lenses.
Figure 2:
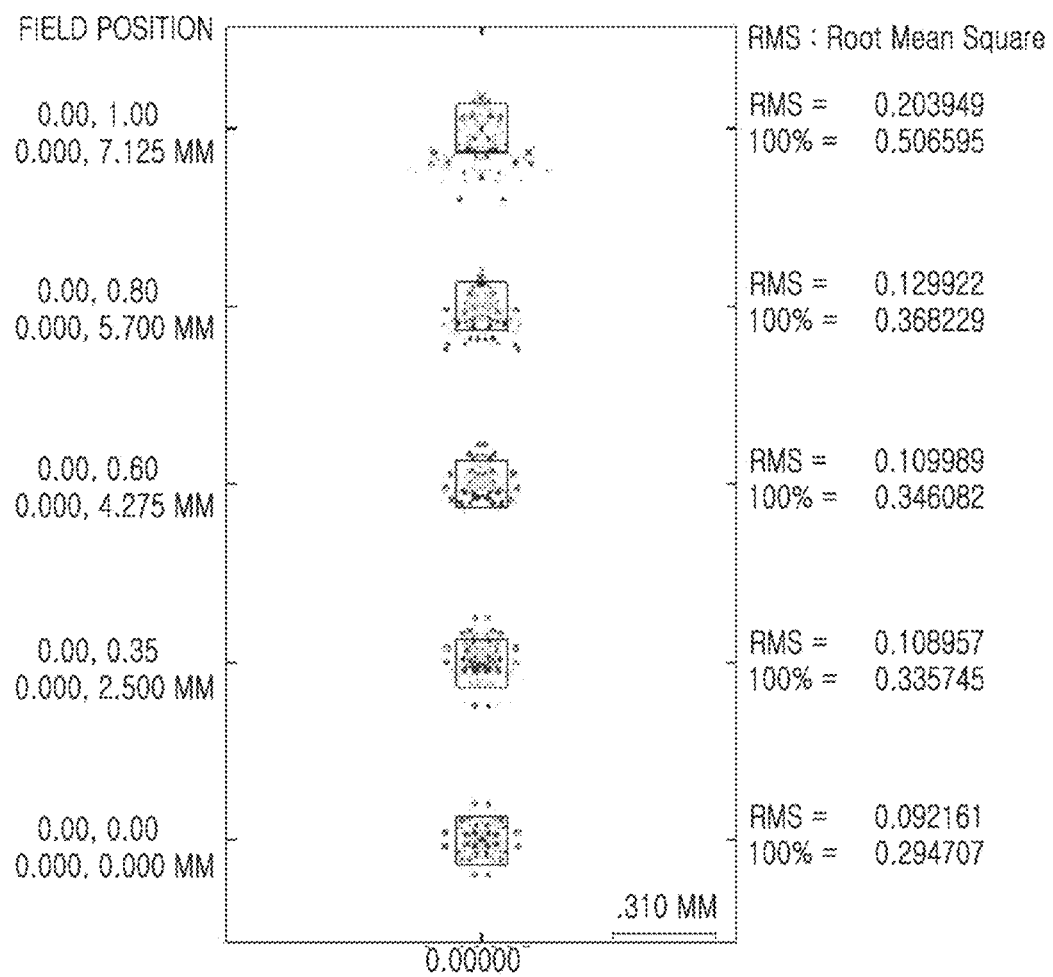
FIG. 2 is a spot diagram showing the performance of the first embodiment of the super wide angle zoom lens in accordance with the present invention.
Figure 3:
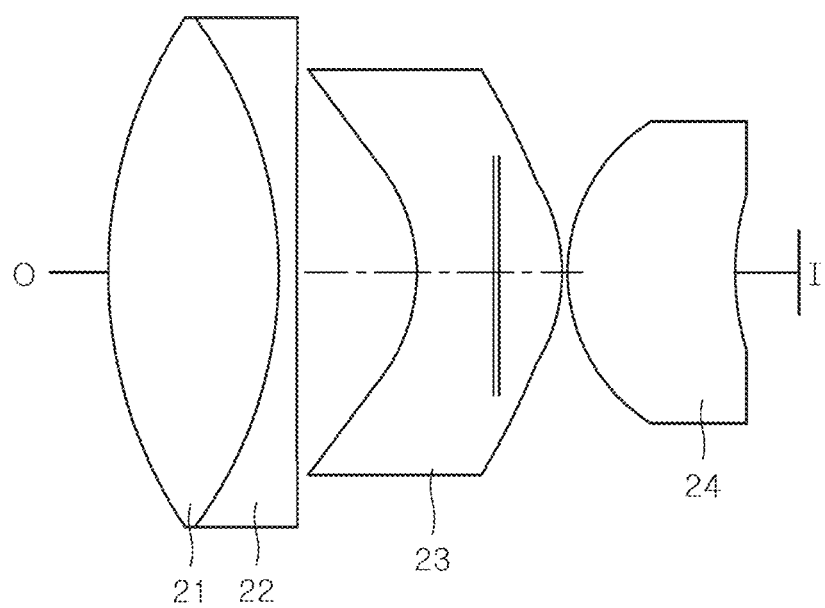
FIG. 3 is an optical path diagram of a second embodiment of the super wide angle zoom lens in accordance with the present invention, illustrating an arrangement of component lenses.
Figure 4:
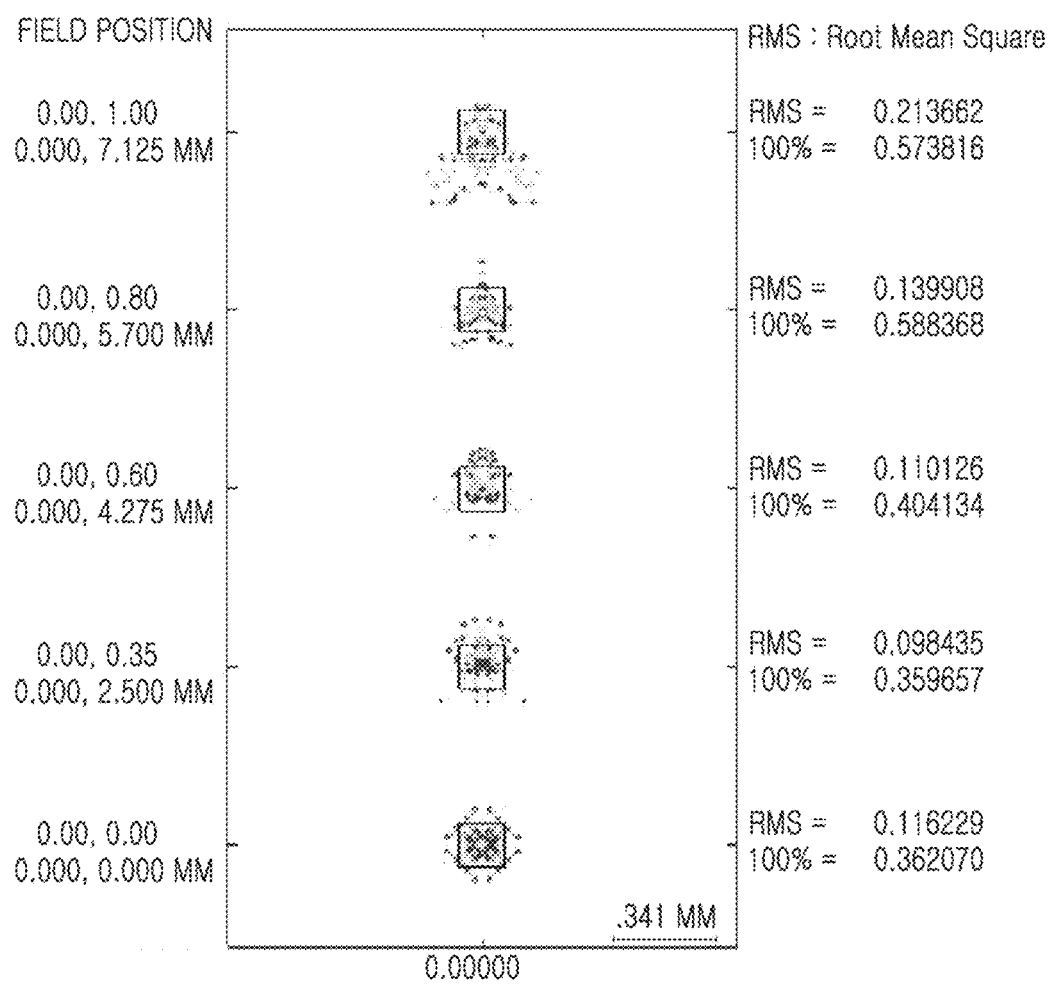
FIG. 4 is a spot diagram showing the performance of the second embodiment of the super wide angle zoom lens in accordance with the present invention.
Figure 5:
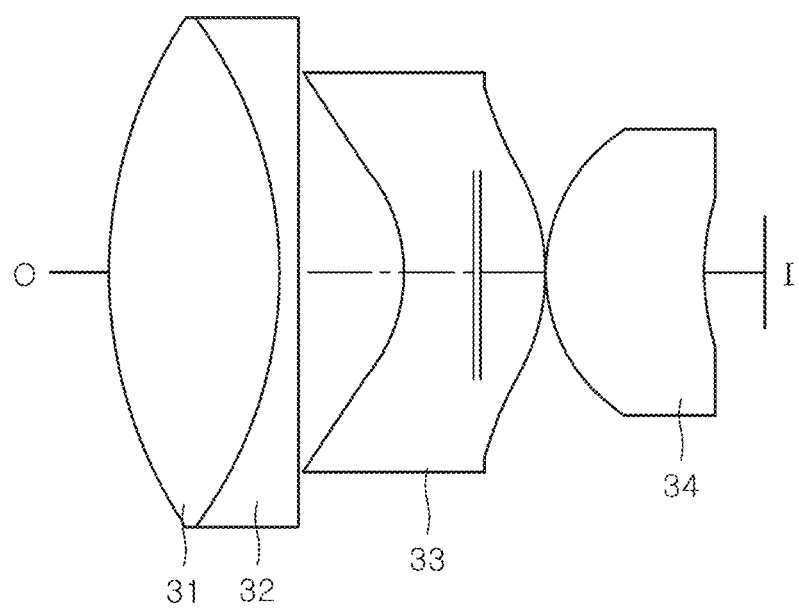
FIG. 5 is an optical path diagram of a third embodiment of the super wide angle zoom lens in accordance with the present invention, illustrating an arrangement of component lenses.
Figure 6:
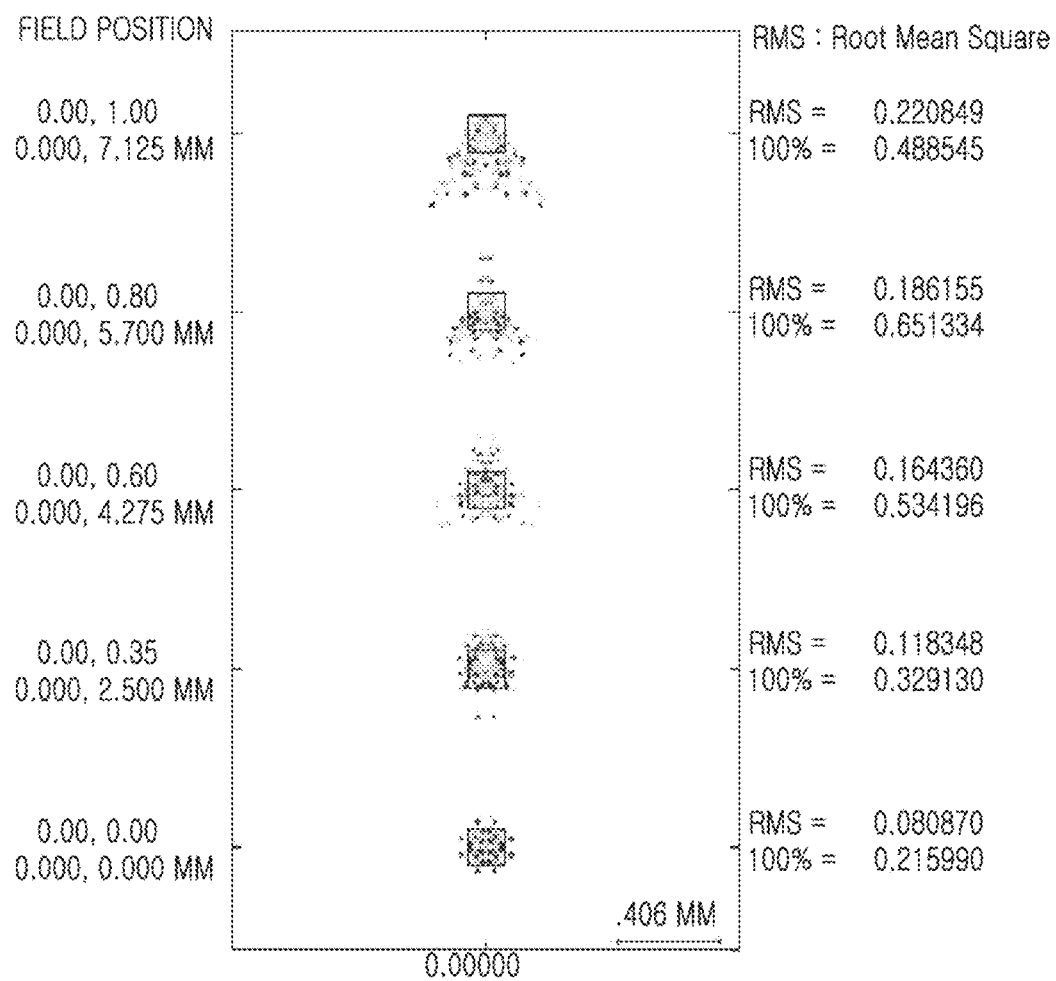
FIG. 6 is a spot diagram showing the performance of the third embodiment of the super wide angle zoom lens in accordance with the present invention.
Figure 7:
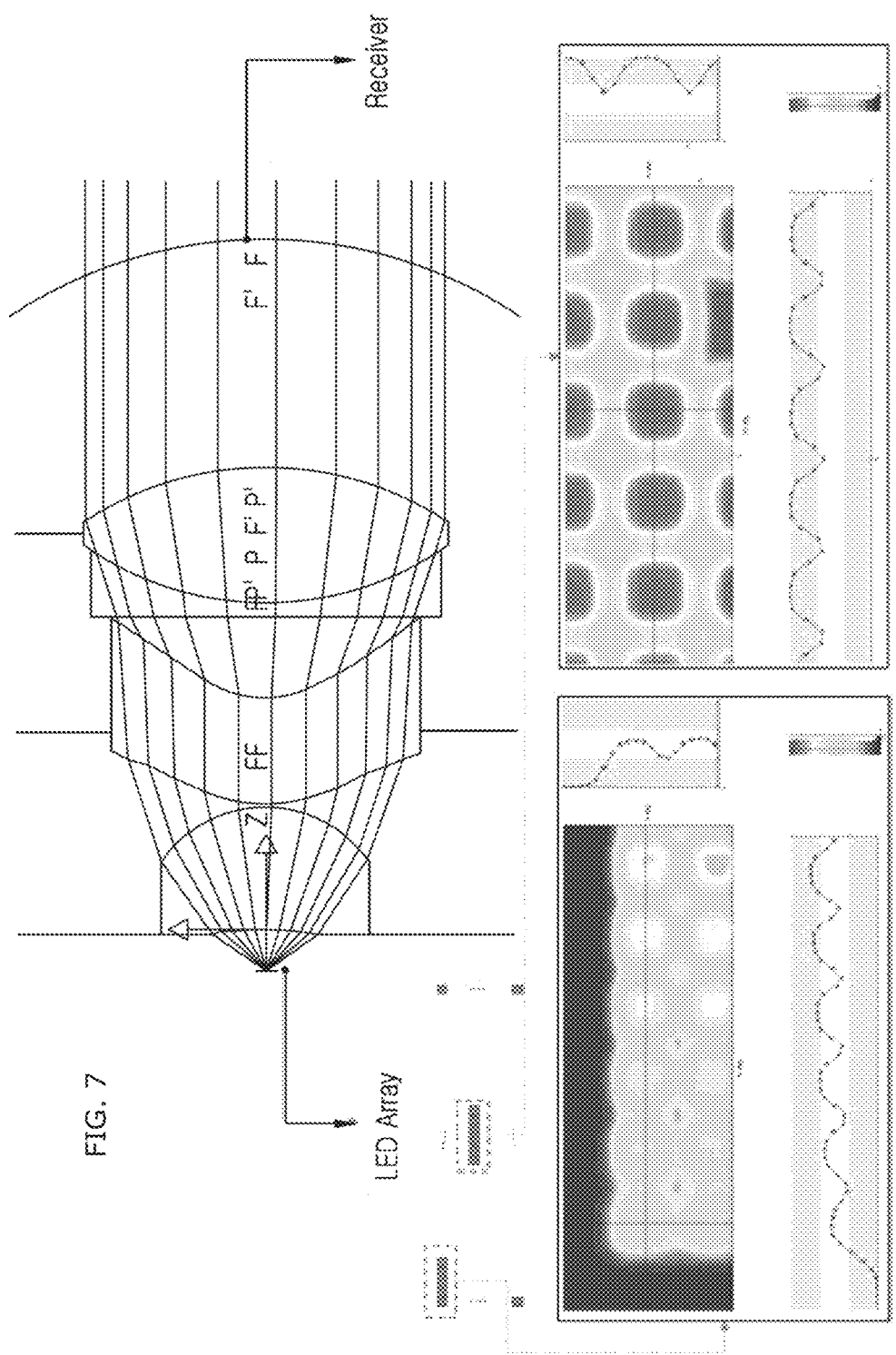
FIG. 7 illustrates that an LED array including a plurality of LEDs is placed at an image side of the super wide angle zoom lens in order to form specific luminance distribution at an object side.
Figure 8:
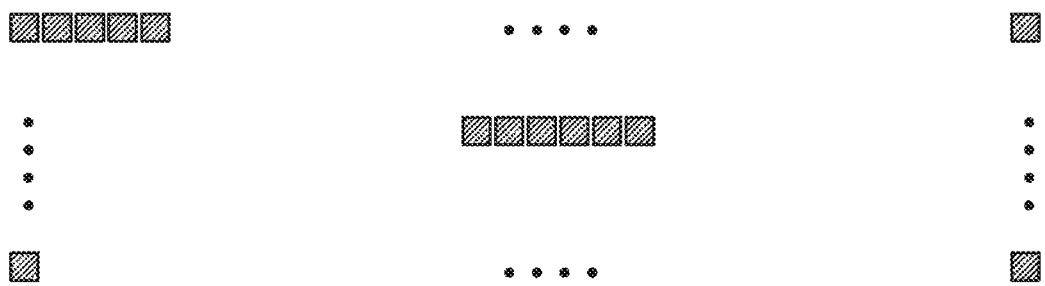
FIG. 8 is an expanded view of the LED array illustrated in FIG. 7.
Figure 9:
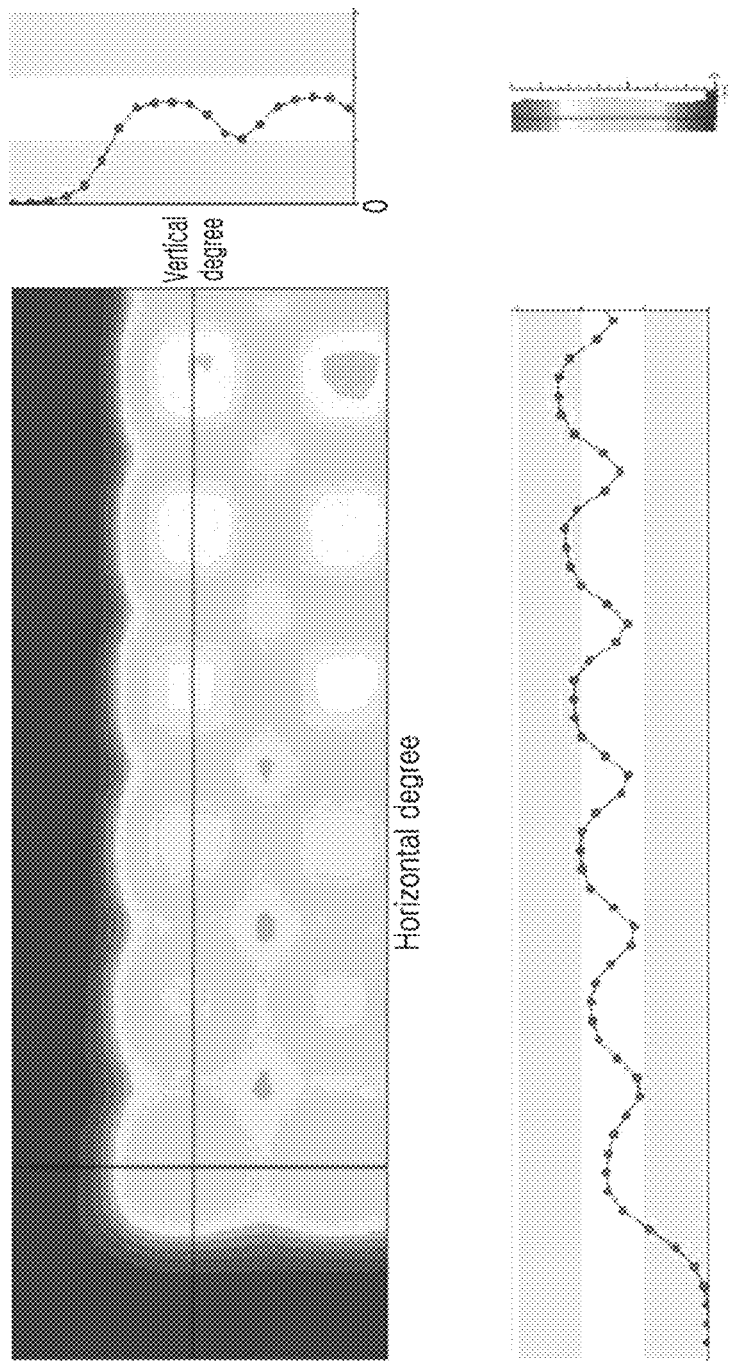
FIG. 9 is an expanded view of light intensity distribution of a peripheral portion of the LED array, which is illustrated at the left bottom of FIG. 7.
Figure 10:
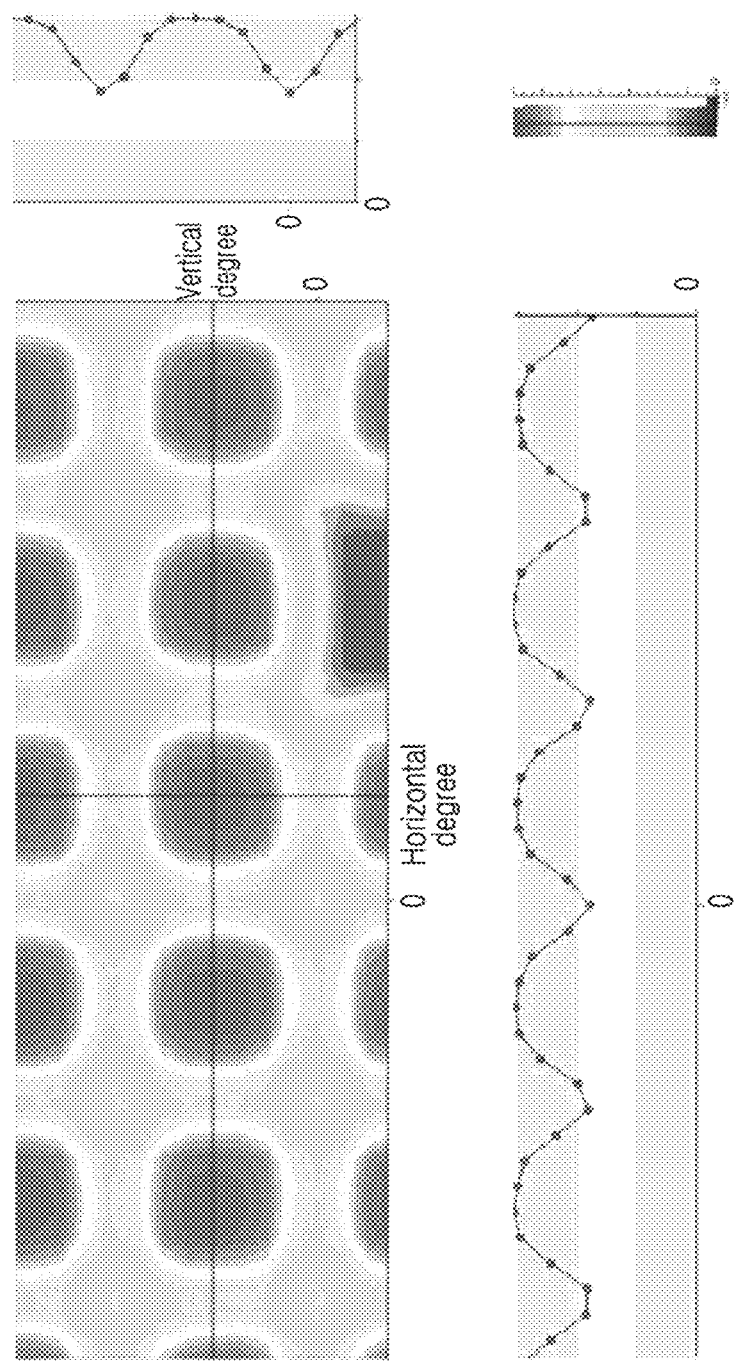
FIG. 10 is an expanded view of light intensity distribution of the central portion of the LED array, which is illustrated at the right bottom of FIG. 7.

FIG. 1 is an optical path diagram of a first embodiment of a super wide angle zoom lens in accordance with the present invention, illustrating an arrangement of component lenses, FIG. 2 is a spot diagram showing the performance of the first embodiment of the super wide angle zoom lens in accordance with the present invention, FIG. 3 is an optical path diagram of a second embodiment of the super wide angle zoom lens in accordance with the present invention, illustrating an arrangement of component lenses, FIG. 4 is a spot diagram showing the performance of the second embodiment of the super wide angle zoom lens in accordance with the present invention, FIG. 5 is an optical path diagram of a third embodiment of the super wide angle zoom lens in accordance with the present invention, illustrating an arrangement of component lenses, FIG. 6 is a spot diagram showing the performance of the third embodiment of the super wide angle zoom lens in accordance with the present invention, FIG. 7 illustrates that an LED array including a plurality of LEDs is placed at an image side of the super wide angle zoom lens in order to form specific luminance distribution at an object side, FIG. 8 is an expanded view of the LED array illustrated in FIG. 7, FIG. 9 is an expanded view of light intensity distribution of a peripheral portion of the LED array, which is illustrated at the left bottom of FIG. 7, and FIG. 10 is an expanded view of light intensity distribution of the central portion of the LED array, which is illustrated at the right bottom of FIG. 7.

The super wide angle zoom lens of which the brightness is fixed in accordance with the present invention may be divided into the first to third embodiments depending on numerical data of component lenses. The first to third embodiments of the super wide angle zoom lenses in accordance with the present invention may commonly include a total of four lenses, that is, two cemented lenses of which the chromatic aberration is adjusted, one aspherical lens, and one additional lens for correcting a curvature of image field, and have a numerical aperture (NA) of 0.75 or more and a field of view (FOV) of 10 degrees or more. For this structure, an aspherical shape needs to be applied to a proper position. However, since the aspherical shape is generally expensive and vulnerable to heat, the aspherical shape may be applied after the cemented lenses.

Referring to FIGS. 1, 3 and 5, the first to third embodiments of the super wide angle zoom lenses of which the brightness is fixed in accordance with the present invention may include first lenses 11, 21 and 31, second lenses 12, 22 and 32, third lenses 13, 23 and 33 and fourth lenses 14, 24 and 34, respectively, which are sequentially arranged from an object side O toward an image side I. Each of the first lenses 11, 21 and 31 may have convex surfaces at the object side O and the image side I, and be formed in a spherical shape. Each of the second lenses 12, 22 and 32 may have a concave surface at the object side O. Each of the third lenses 13, 23 and 33 may have a convex surface at the image side I. Each of the fourth lenses 14, 24 and 34 may have a convex surface at the object side O, and be formed in a spherical shape.

The first lens 11, 21 or 31 and the second lens 12, 22 or 32 may be cemented to each other to constitute a cemented lens. When any one of the first lens 11, 21 or 31 and the second lens 12, 22 or 32 which constitute the cemented lens has an aspherical shape, the manufacturing cost may be significantly increased. Therefore, both of the first lens 11, 21 or 31 and the second lens 12, 22 and 32 may be spherical lenses.

The fourth lens 14, 24 or 34 positioned at the last stage of the image side I may be configured as a spherical lens made of glass, in order to correct a curvature of image field while considering a shape change induced by heat generation when an LED is driven.

When the NA is increased, spherical aberration may rapidly increase. Therefore, the third lenses 13, 23 and 33 may be configured as aspherical lenses, and made of plastic in consideration of a reduction in manufacturing cost and a distance from the light source, which is related to a shape change caused by heat generation. When the plastic lens is applied, a lens having a long focal distance and small refractive power may be applied in order to minimize a performance change depending on the shape change induced by heat generation.

Since plastic generally has a low refractive index, astigmatism may occur to blur an image. Furthermore, plastic may not be suitable for correcting a curvature of image field. Therefore, in order to compensate for the selection of plastic for the third lens 13, 23 or 33, a high refractive index material may be applied as the first lens 11, 21 or 31, and the first lens 11, 21 or 31 may be made of glass.

The first lens 11, 21 or 31 and the second lens 12, 22 or 32 may be cemented and configured as the cemented lens. In this case, a material with high ultraviolet transmittance may be applied to cement the two lenses. Therefore, the first lens 11, 21 or 31 may be made of glass, and a lens having an Abbe number of 35 or more and a d-line refractive index of 1.7 to 1.92 may be applied as the first lens 11, 21 or 31.

The first lens 11, 21 or 31 and the second lens 12, 22 or 32 may be not cemented to each other. In this case, a Fresnel loss may increase at the surface where the two lenses face each other. Therefore, in order to raise the transmittance, the first lens 11, 21 or 31 and the second lens 12, 22 or 32 may be cemented to each other, and the first lens 11, 21 or 31 may be made of glass. Thus, the second lens 12, 22 or 32 cemented to the first lens 11, 21 or 31 may also be made of glass.

In general, a cemented lens for forming an image of an object at infinity may be made of crown-based glass having a high Abbe number and flint-based glass having a low Abbe number.

When glass is applied to the first lens 11, 21 or 31 and a lens having an Abbe number of 35 or more and a d-line refractive index of 1.7 to 1.92 is applied, such a lens may be a lens made of crown-based glass. Thus, in order to remove chromatic aberration, a flint-based lens having an Abbe number of less than 30 may be applied as the second lens 12, 22 or 32.

The fourth lens 14, 24 or 34 may have a positive refractive power, and have a meniscus shape convex toward the object side O.

Light having passed through lenses from the first lens 11, 21 or 31 to the third lens 13, 23 or 33 may become a convergent beam. In order to raise the NA, the convergent beam needs to be converged again. At this time, in order to minimize spherical aberration and coma aberration, a lens having a meniscus shape convex toward the object side O may be applied as the fourth lens 14, 24 or 34.

The super wide angle zoom lens of which the brightness is fixed in accordance with the present invention may satisfy the following equation.

$$9 \leq |f_3/f| \qquad \text{[Equation 1]}$$

In Equation 1, $f_3$ represents the focal distance of the third lens 13, 23 or 33, and f represents the focal distance of the entire super wide angle zoom lens.

Under a condition that satisfies Equation 1, sufficient optical performance can be obtained.

When the value of $|f_3/f|$ decreases, it may indicate that the focal distance is decreased, and when the value of $|f_3/f|$ increases, it may indicate that the focal distance is increased. Therefore, in order to minimize a performance change caused by an environmental change, the focal distance needs to be increased. Thus, the upper limit of the value of $|f_3/f|$ does not need to be limited.

The super wide angle zoom lens of which the brightness is fixed in accordance with the present invention may satisfy the following equation.

$$0.9 \leq r_{last}/f_3 \qquad \text{[Equation 2]}$$

In Equation 2, $r_{last}$ represents the curvature of the last surface of the super wide angle zoom lens, and f represents the focal distance of the entire super wide angle zoom lens.

When the curvature of the last surface of the super wide angle zoom lens is excessively decreased, a working distance may be significantly reduced. On the other hand, when the curvature of the last surface of the super wide angle zoom lens is excessively increased, it may make it difficult to correct aberration.

The super wide angle zoom lens of which the brightness is fixed in accordance with the present invention may satisfy the following equation.

$$-0.01 \leq (r_1 - r_{last})/(r_1 + r_{last}) \leq 0.2 \qquad \text{[Equation 3]}$$

In Equation 3, $r_1$ represents the curvature of the first surface of the super wide angle zoom lens, and $r_{last}$ represents the curvature of the last surface of the super wide angle zoom lens.

In general, an optical system with a very high NA may employ a convex surface as the first surface thereof, in order to converge light rays. Furthermore, the optical system may employ a plane or concave surface as the last surface thereof, in order to correct spherical aberration and coma aberration at the same time. Furthermore, the other intermediate surfaces may be in charge of various aberration correction operations.

Therefore, the curvatures of the first surface and the last surface of the super wide angle zoom lens of which the brightness is fixed in accordance with the present invention need to satisfy Equation 3. The lower limit of the value of Equation 3 may indicate a condition in which the last surface is almost plane, and the upper limit of the value of Equation 3 may indicate a condition for preventing spherical aberration from being excessively corrected.

The super wide angle zoom lens of which the brightness is fixed in accordance with the present invention may satisfy the following equation.

$$0.15 \leq d_3/TL \leq 0.25 \qquad \text{[Equation 4]}$$

In Equation 4, $d_3$ represents the thickness of the third lens 13, 23 or 33, and TL represents the total length of the super wide angle zoom lens from the curvature of the first surface to the curvature of the last surface.

The lens made of plastic needs to have a proper value for $d_3/TL$ in order to satisfy a molding condition during injection molding. The lower limit of the value of [Equation 4] may indicate that the thickness of the lens made of plastic is decreased, and the upper limit of the value of [Equation 4] may indicate that the thickness of the lens made of plastic is increased. When the thickness of the lens made of plastic is excessively decreased, the shape of the lens may be changed by injection molding. When the thickness of the lens made of plastic is excessively increased, it may take a long injection molding time, thereby degrading mass productivity.

As illustrated in FIG. 7, the super wide angle zoom lens of which the brightness is fixed in accordance with the present invention may have a configuration in which one LED or an LED array including a plurality of LEDs is placed at the image side I and specific luminance distribution is formed at the object side O.

FIG. 8 is an expanded view of the LED array illustrated in FIG. 7, illustrating that the LED array includes a peripheral portion and a central portion.

FIG. 9 is an expanded view of light intensity distribution of the peripheral portion of the LED array, which is illustrated in the left bottom of FIG. 7. As illustrated in FIG. 9, when light of the LED array is projected through the super wide angle zoom lens of which the brightness is fixed in accordance with the present invention, light of the peripheral portion of the LED array may be irradiated with uniform luminance distribution.

FIG. 10 is an expanded view of light intensity distribution of the central portion of the LED array, which is illustrated in the right bottom of FIG. 7. As illustrated in FIG. 10, when light of the LED array is projected through the super wide angle zoom lens of which the brightness is fixed in accordance with the present invention, light of the central portion of the LED array may be irradiated with uniform luminance distribution.

In the super wide angle zoom lens of which the brightness is fixed in accordance with the present invention, a lens made of crown-based glass and a lens made of flint-based glass may be applied as the first lens 11, 21 or 31 and the second lens 12, 22 or 32, respectively, and cemented to each other to minimize chromatic aberration. In this case, a material for minimizing chromatic aberration needs to be selected as a lens after the third lens 13, 23 or 33. However, since the material of the third lens 13, 23 or 33 is desirably limited to plastic, an occurrence of chromatic aberration needs to be minimized in the material of the fourth lens 14, 24 or 34. Therefore, a lens having an Abbe number of 40 or more may be employed as the fourth lens 14, 24 or 34 positioned after the third lens 13, 23 or 33.

In the first to third embodiments of the super wide angle zoom lenses of which the brightness is fixed in accordance with the present invention, only one lens may be used after the third lens 13, 23 or 33. However, this is only in order to minimize the manufacturing cost. In general, since the performance of the super wide angle zoom lens can be improved as lenses are added, various embodiments can be provided through the addition of the lenses.

Hereafter, the first to third embodiments of the super wide angle zoom lenses of which the brightness is fixed in accordance with the present invention will be described in more detail with reference to FIGS. 1 to 6 and Tables 1 to 10.

First Embodiment

Table 1 shows lens data of the respective lens surfaces of the first embodiment of the super wide angle zoom lens of which the brightness is fixed in accordance with the present invention, and the first embodiment based on such lens data is illustrated in FIG. 1. Table 1 specifies the respective lens surfaces in the order in which the lens surfaces are counted from the object side O. In Table 1, a lens surface with * is an aspherical surface, and a curvature radius and a thickness or distance between lenses are expressed in millimeter.

Table 2 shows aspherical data for defining the aspherical shapes of the aspherical lens surfaces in the first embodiment of the super wide angle zoom lens of which the brightness is fixed in accordance with the present invention, and the lens surfaces of Table 2 are specified in the order in which the lens surfaces are counted from the object side O.

Table 3 shows performance data of a lighting apparatus for a vehicle, to which the first embodiment of the super wide angle zoom lens of which the brightness is fixed in accordance with the present invention is applied.

Here, EFL represents the effective focal length (mm) of the entire super wide angle zoom lens in accordance with the present invention, FOV represents a field of view (degrees), NA represents a numeral aperture indicating brightness, and TL represents the total length of the super wide angle zoom lens from the curvature of the first surface to the curvature of the last surface. The first embodiment of the super wide angle zoom lens may have an NA of 0.840 higher than 0.75 and an FOV of 14.024 degrees larger than 10 degrees. Therefore, the first embodiment of the super wide angle zoom lens of which the brightness is fixed in accordance with the present invention can efficiently transmit light, and thus increase the FOV while satisfying the brightness. Furthermore, since the number of lenses is reduced, the manufacturing cost can be lowered.

FIG. 2 illustrates the luminance distribution of light in the first embodiment of the super wide angle zoom lens of which the brightness is fixed in accordance with the present invention, showing that the light is irradiated with uniform luminance distribution within a rectangular region.

TABLE 1

| Lens surface umber | Radius of curvature | Thickness or inter-lens distance | nd (refractive index) | vd (Abbe number) |
|---|---|---|---|---|
| object | infinity | infinity | | |
| 1 (first surface) | 40.514 | 20.600 | 1.71700 | 47.98 |
| 2 (second surface) | −40.514 | 2.000 | 1.84666 | 23.78 |
| 3 (third surface) | −648.135 | 11.511 | | |
| 4 (fourth surface) | −16.062 | 15.000 | 1.49176 | 57.47 |
| 5 (STOP) * (fifth surface) | −18.808 | 0.400 | | |
| 6 (sixth surface) | 18.022 | 16.950 | 1.74400 | 44.90 |
| 7 (seventh surface) | 30.192 | | | |
| image | infinity | 0.000 | | |

TABLE 2

| Asphere | Fourth surface | Fifth surface |
|---|---|---|
| K | −1.000000 | −2.204682 |
| A | 1.081111E−05 | −9.823129E−06 |
| B | 2.926935E−08 | 3.959935E−08 |
| C | −7.738041E−11 | −7.168510E−11 |
| D | 6.041920E−14 | 5.135389E−14 |

TABLE 3

| EFL | 30.000246 |
|---|---|
| FOV | 14.024658 |
| NA | 0.840000 |
| TL | 64.461000 |

Second Embodiment

Table 4 shows lens data of the respective lens surfaces of the second embodiment of the super wide angle zoom lens of which the brightness is fixed in accordance with the present invention, and the second embodiment based on such lens data is illustrated in FIG. 3. Table 4 specifies the respective lens surfaces in the order in which the lens surfaces are counted from the object side O. In Table 4, a lens surface with * is an aspherical surface, and a curvature of radius and a thickness or distance between lenses are expressed in millimeter.

Table 5 shows aspherical data for defining the aspherical shapes of the aspherical lens surfaces in the second embodiment of the super wide angle zoom lens of which the brightness is fixed in accordance with the present invention, and the lens surfaces of Table 5 are specified in the order in which the lens surfaces are counted from the object side O.

Table 6 shows performance data of a lighting apparatus for a vehicle, to which the second embodiment of the super wide angle zoom lens of which the brightness is fixed in accordance with the present invention is applied.

Here, EFL represents the effective focal length (mm) of the entire super wide angle zoom lens in accordance with the present invention, FOV represents a field of view (degrees), NA represents a numeral aperture indicating brightness, and TL represents the total length of the super wide angle zoom lens from the curvature of the first surface to the curvature of the last surface. The second embodiment of the super wide angle zoom lens may have an NA of 0.840 higher than 0.75 and an FOV of 13.772 degrees larger than 10 degrees. Therefore, the second embodiment of the super wide angle zoom lens in accordance with the present invention can efficiently transmit light, and thus increase the FOV while satisfying the brightness. Furthermore, since the number of lenses is reduced, the manufacturing cost can be lowered.

FIG. 4 illustrates the luminance distribution of light in the second embodiment of the super wide angle zoom lens of which the brightness is fixed in accordance with the present invention, showing that the light is irradiated with uniform luminance distribution within a rectangular region.

TABLE 4

| S# (lens surface number) | Radius of curvature | Thickness or inter-lens distance | nd (refractive index) | vd (Abbe number) |
|---|---|---|---|---|
| object | infinity | infinity | | |
| 1 (first surface) | 45.761 | 18.700 | 1.88300 | 40.80 |
| 2 (second surface) | −45.761 | 2.000 | 1.92286 | 20.88 |
| 3 (third surface) | infinity | 11.763 | | |
| 4 (fourth surface) | −14.360 | 15.000 | 1.49176 | 57.47 |
| 5 (STOP) * (fifth surface) | −19.281 | 0.400 | | |
| 6 (sixth surface) | 18.541 | 16.950 | 1.74400 | 44.90 |
| 7 (seventh surface) | 43.702 | | | |
| image | infinity | 0.000 | | |

TABLE 5

| ASP | Fourth surface | Fifth surface |
|-----|----------------|---------------|
| K | −1.000000 | −2.420239 |
| A | 2.905578E−05 | −3.078209E−06 |
| B | −4.203511E−09 | 4.072430E−08 |
| C | −3.022734E−11 | −7.828905E−11 |
| D | 2.765704E−14 | 6.054073E−14 |

TABLE 6

| | |
|---|---|
| EFL | 30.000000 |
| FOV | 13.772629 |
| NA | 0.840000 |
| TL | 64.813000 |

Third Embodiment

Table 7 shows lens data of the respective lens surfaces of the third embodiment of the super wide angle zoom lens of which the brightness is fixed in accordance with the present invention, and the third embodiment based on such lens data is illustrated in FIG. 5. Table 7 specifies the lens surfaces in the order in which the lens surfaces are counted from the object side O. In Table 4, a lens surface with * is an aspherical surface, and a curvature of radius and a thickness or distance between lenses are expressed in millimeter.

Table 8 shows aspherical data for defining the aspherical shapes of the aspherical lens surfaces in the third embodiment of the super wide angle zoom lens of which the brightness is fixed in accordance with the present invention, and the lens surfaces of Table 8 are specified in the order in which the lens surfaces are counted from the object side O.

Table 9 shows performance data of a lighting apparatus for a vehicle, to which the third embodiment of the super wide angle zoom lens of which the brightness is fixed in accordance with the present invention is applied.

Here, EFL represents the effective focal length (mm) of the entire super wide angle zoom lens in accordance with the present invention, FOV represents a field of view (degrees), NA represents a numeral aperture indicating brightness, and TL represents the total length of the super wide angle zoom lens from the curvature of the first surface to the curvature of the last surface. The third embodiment of the super wide angle zoom lens may have an NA of 0.836 higher than 0.75 and an FOV of 13.651 degrees larger than 10 degrees. Therefore, the third embodiment of the super wide angle zoom lens in accordance with the present invention can efficiently transmit light, and thus increase the FOV while satisfying the brightness. Furthermore, since the number of lenses is reduced, the manufacturing cost can be lowered.

FIG. 6 illustrates the luminance distribution of light in the third embodiment of the super wide angle zoom lens of which the brightness is fixed in accordance with the present invention, showing that the light is irradiated with uniform luminance distribution within a rectangular region.

TABLE 7

| S# (lens surface number) | Radius of curvature | Thickness or inter-lens distance | nd (refractive index) | vd (Abbe number) |
|---|---|---|---|---|
| object | infinity | infinity | | |
| 1 (first surface) | 44.880 | 19.000 | 1.90043 | 37.37 |
| 2 (second surface) | −44.880 | 2.000 | 1.92286 | 20.88 |

TABLE 7-continued

| S# (lens surface number) | Radius of curvature | Thickness or inter-lens distance | nd (refractive index) | vd (Abbe number) |
|---|---|---|---|---|
| 3 (third surface) | infinity | 10.919 | | |
| 4 (fourth surface) | −13.657 | 15.000 | 1.49176 | 57.47 |
| 5 (STOP) * (fifth surface) | −19.297 | 0.100 | | |
| 6 (sixth surface) | 18.251 | 16.950 | 1.72916 | 54.67 |
| 7 (seventh surface) | 45.056 | | | |
| image | infinity | 0.106 | | |

TABLE 8

| ASP | Fourth surface | Fifth surface |
|-----|----------------|---------------|
| K | −0.732587 | −1.509239 |
| A | 4.988131E−05 | 1.531421E−05 |
| B | 8.783629E−09 | 2.534442E−08 |
| C | −7.401015E−11 | −9.256203E−11 |
| D | 1.115444E−13 | 9.340520E−14 |

TABLE 9

| | |
|---|---|
| EFL | 29.999677 |
| FOV | 13.651 |
| NA | 0.836 |
| TL | 63.969000 |

Table 10 shows the calculation results of Equations 1 to 4 using the data of the first to third embodiments of the super wide angle zoom lens of which the brightness is fixed in accordance with the present invention. Table 10 shows that the first embodiment satisfies the equations best.

TABLE 10

| | First embodiment | Second embodiment | Third embodiment |
|---|---|---|---|
| $f_3$ | 276.5200 | 14924.657 | −783.065 |
| f | 30.000 | 30.000 | 30.000 |
| $r_1$ | 40.541 | 45.761 | 44.880 |
| $r_{last}$ | 30.192 | 43.702 | 46.056 |
| $d_3$ | 15 | 15.000 | 15.000 |
| TL | 66.461 | 64.813 | 63.969 |
| $9 \leq |f/f_3|$ [Equation 1] | 9.217 | 497.489 | −26.102 |
| $0.9 \leq r_{last}/f \leq 3$ [Equation 2] | 1.006 | 1.457 | 1.502 |
| $-0.01 \leq (r_1 - r_{last})/(r_1 + r_{last}) \leq 0.2$ [Equation 3] | 0.146 | 0.023 | −0.002 |
| $0.15 \leq d_3/TL \leq 0.25$ [Equation 4] | 0.226 | 0.231 | 0.234 |

As described above, the super wide angle zoom lens in accordance with the present invention may be optimized by using a cemented lens composed of two lenses for correcting chromatic aberration, one aspherical lens and one additional lens for correcting a curvature of image field. Thus, the super wide angle zoom lens can raise the NA to 0.75 or more even while using four lenses, thereby raising transmission efficiency of light and increasing the FOV.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A super wide angle zoom lens comprising:
a first lens having convex surfaces at an object side and an image side, and formed in a spherical shape;
a second lens having a concave surface at the object side;
a third lens having a convex surface at the image side; and
a fourth lens having a convex surface at the object side and formed in a spherical shape,
wherein the first to fourth lenses are sequentially arranged from the object side toward the image side,
wherein the super wide angle zoom lens satisfies the following equation:

$$9 \leq |f_3/f|,$$

where $f_3$ represents a focal distance of the third lens, and f represents a focal distance of an entire super wide angle zoom lens.

2. The super wide angle zoom lens of claim 1, wherein the first lens comprises glass.

3. The super wide angle zoom lens of claim 2, wherein the fourth lens comprises glass.

4. The super wide angle zoom lens of claim 3, wherein the second lens comprises glass.

5. The super wide angle zoom lens of claim 4, wherein the third lens comprises plastic.

6. The super wide angle zoom lens of claim 1, wherein the first lens has an Abbe number of 35 or more and a d-line refractive index of 1.7 to 1.92.

7. The super wide angle zoom lens of claim 1, wherein the second lens has an Abbe number of less than 30 and is a flint-based lens.

8. The super wide angle zoom lens of claim 1, wherein the third lens has an aspherical shape.

9. The super wide angle zoom lens of claim 1, wherein the fourth lens has a positive refractive power, and has a meniscus shape convex toward the object side.

10. The super wide angle zoom lens of claim 1, wherein one LED or an LED array including a plurality of LEDs is placed at the image side, and specific luminance distribution is formed at the object side.

11. The super wide angle zoom lens of claim 10, wherein all lenses positioned after the third lens have an Abbe number of 40 or more.

12. The super wide angle zoom lens of claim 1, wherein the super wide angle zoom lens satisfies the following equation:

$$0.9 r_{last}/f \leq 3,$$

where $r_{last}$ represents a curvature of a last surface of an entire super wide angle zoom lens, and f represents a focal distance of the entire super wide angle zoom lens.

13. The super wide angle zoom lens of claim 1, wherein the super wide angle zoom lens satisfies the following equation:

$$-0.0(r_1 - r_{last})/(r_1 + r_{last}) \leq 0.2,$$

where $r_1$ represents a curvature of a first surface of an entire super wide angle zoom lens, and $r_{last}$ represents a curvature of a last surface of the super wide angle zoom lens.

14. The super wide angle zoom lens of claim 1, wherein the super wide angle zoom lens satisfies the following equation:

$$0.15 d_3/TL \leq 0.25,$$

where $d_3$ represents the thickness of the third lens, and TL represents a total length of the super wide angle zoom lens from the curvature of a first surface to the curvature of a last surface.

* * * * *